United States Patent [19]

Wallace

[11] Patent Number: 4,687,044

[45] Date of Patent: Aug. 18, 1987

[54] INJECTION METHOD AND APPARATUS

[75] Inventor: Clarence L. Wallace, Del Mar, Calif.

[73] Assignee: Tam Ceramics, Inc., Niagara Falls, N.Y.

[21] Appl. No.: 730,399

[22] Filed: May 3, 1985

[51] Int. Cl.⁴ .................. B22D 13/00; B22D 19/00
[52] U.S. Cl. ........................ 164/100; 164/98;
    164/108; 164/112; 164/114; 164/286; 164/290;
    164/333
[58] Field of Search ............ 164/61, 98–103,
    164/105, 108–110, 112, 114, 115, 118, 253,
    286–290, 294, 296, 332, 333, 338.1

[56] References Cited

U.S. PATENT DOCUMENTS

| | | | |
|---|---|---|---|
| 3,559,718 | 2/1971 | Hitchings | 164/289 |
| 3,666,919 | 5/1972 | Thiel | 164/250.1 |
| 3,679,950 | 7/1972 | Rutt | 317/258 |
| 3,818,974 | 6/1974 | Eberle | 164/289 |
| 4,044,816 | 8/1977 | Kreueger et al. | 164/98 |
| 4,111,255 | 9/1978 | Krueger et al. | 164/255 |
| 4,291,741 | 9/1981 | Willem | 164/98 |
| 4,353,957 | 10/1982 | Rutt et al. | 428/292 |
| 4,510,987 | 4/1985 | Collot | 164/900 |

FOREIGN PATENT DOCUMENTS

70055 1/1983 European Pat. Off. ............ 164/286

Primary Examiner—Nicholas P. Godici
Assistant Examiner—Richard K. Seidel
Attorney, Agent, or Firm—Kenyon & Kenyon

[57] ABSTRACT

A centrifugal injection machine comprises a rotor arm bearing at each of a pair of free ends a pivotably mounted container. A holder which retains a multiplicity of workpieces is insertable into a capsule or cavity within each container. The rotary arm contains a reservoir associated with each container or liquifying a charge of material. Upon rotation of the machine at a high velocity, the liquified material is transferred from the reservoir to the container in a vacuum and is pressurized therein as a result of centripetal acceleration. Upon the termination of a predetermined interval, a trip mechanism is activated to rotate the containers so that the molten liquid which has not been injected under pressure into recesses in the workpieces is ejected or discharged from the containers. The containers rotate within a vacuum chamber which is depressurized prior to the centrifuge operation.

66 Claims, 17 Drawing Figures

INJECTION METHOD AND APPARATUS

BACKGROUND OF THE INVENTION

The present invention relates to a method and device for injecting molten materials into voids in small bodies and more particularly to forming electrodes and/or conductors in small ceramic dielectric or insulating bodies. Examples of products that can be made in accordance with the present invention are monolithic capacitors and multi-layer circuit structures such as are used for hybrid integrated circuits.

The modern electronics industry has created an ever growing demand for cheaper, smaller high performance components particularly multilayer ceramic capacitors hereinafter referred to as "MLCs".

In a typical known method for producing such ceramic capacitors, an electroding paste of a noble metal such as platinum or palladium is applied to the top face of a small, usually cast, thin sheet of a suitable ceramic dielectric composition bonded with an organic temporary binder, the application being made in such manner that the deposit of electroding paste extends to one edge of the sheet only and a clear margin is left around three sides of the deposit. A plurality of the small sheets thus coated with electrode paste are then stacked, successive sheets being rotated about an axis normal to the plane of the sheet, whereby successive electroding paste deposits extend to opposite edges of the stack. The stack of paste-coated sheets is then suitably consolidated and heated to drive off or decompose the organic binders of the ceramic sheet and the electroding paste and to sinter the dielectric composition into a unitary, multilayer body having successive electrodes exposed on opposite ends thereof. The electrodes exposed on each end are then electrically connected with a termination electrode in known manner.

Because of the necessity for using noble metal internal electrodes in the type process just described, such monolithic ceramic capacitors are expensive. Lower cost, silver electrodes such as are commonly used with other ceramic capacitors are generally unsuitable for monolithic capacitors because the silver, applied as an electrode paste, would be subjected to a high temperature during firing to mature the ceramic and would thereby be deleteriously affected. Accordingly, a method of producing monolithic capacitors that does not require the use of noble or very expensive metals was desired.

Such a method has been described in U.S. Pat. No. 3,679,950, granted July 25, 1972, the text of which is incorporated herein by reference. In that patent a number of procedures are disclosed which involve the formation of sintered ceramic matrices that have strata of dense dielectric material alternating with strata of porous ceramic material and the subsequent deposition of conductive material, which may be low-cost metals, in said porous strata.

A similar method providing for production of sintered ceramic matrices in which internal electrodes can be formed by introduction of conductive material, such as metal, to form capacitors wherein continuity of and low resistance in such electrodes is easily obtained, while the ceramic matrix prior to impregnation has adequate strength is described in U.S. Pat. No. 4,353,957 the text of which is also incorporated herein by reference.

In the latter method ceramic bodies that have a plurality of superposed thin layers or strata of dense dielectric material, adjacent layers having between them thin substantially planar spaces or cavities open at one edge region. The spaces or cavities are interrupted only by one or more distinct pillars, substantially all of which, when there are a plurality, are separated. Thus, it is possible to readily introduce conductive material, such as metal, into the cavities in the matrix to provide a body having continuous conductive layers or strata alternating with dielectric ceramic strata.

A typical procedure for introducing conductive material into these cavities in sintered bodies involves submerging them in a bath of molten material, e.g., lead, in a sealed vessel and reducing the pressure in the vessel to evacuate the cavities to be filled and then raising the pressure in the vessel to force the molten material into the cavities.

A disadvantage of this type of procedure is that contaminants, e.g., dross or the like, in the molten material enters the cavities which may adversely affect the electrical properties of the finished component.

Another disadvantage of such conventional procedures involves the undesirable adhesion of molten material to the exterior surfaces of the components which often causes them to fuse together upon removal from the molten bath making them difficult to handle and also adversely affects their appearance.

An object of the present invention is to provide an improved method and device for injecting molten materials into minute voids in small bodies.

Another, more particular, object of the present invention is to provide an improved method and device for injecting liquified conductive materials into thin plate-shaped recesses in small ceramic workpieces.

Yet another object of the present invention is to provide an improved method and device for filling recesses in a workpiece with a liquified substance, in which the outer surfaces of the workpiece are substantially free of the liquified substance upon completion of the injection or filling operation.

Yet another object of the present invention is to provide an improved method and apparatus for injecting a liquified substance into recesses in a workpiece, in which fusion of separate workpieces during the injection or filling operation is substantially reduced, if not entirely eliminated.

Yet another object of the invention is to provide an improved method and apparatus for injecting liquified conductive material into recesses in a workpiece, in which the adherence of metal oxides to the outer suface of the workpiece is substantially reduced or eliminated.

Yet another object of the present invention is to provide an improved method and apparatus for injecting liquified conductive material into thin plane-shaped recesses in a small ceramic workpiece having metallized terminal layers, in which the disintegration or dissolving of the layers during an insertion process is reduced.

SUMMARY OF THE INVENTION

An apparatus for filling minute recesses in a workpiece with a liquified substance comprises, in accordance with the invention, a frame, a container or carrier member having a receptacle for receiving the workpiece, and a rotary support arm or boom for supporting the container and for rotating the container about a rotation axis. A drive is operatively linked to the rotary support arm for rotating the arm and the container about the rotation axis. A retainer element is disposable in the receptacle for retaining the workpiece therein. Feed means is mounted to the frame for filling the receptacle at least partially full with a liquified material. A heating element is provided in the container for supplying thermal energy to liquified material in the receptacle to maintain the material in a liquified form during an injection phase of an operating cycle. An actuator is mounted to the frame for ejecting free liquified material from the receptacle during a discharge phase of an operating cycle upon an injection of a portion of the liquified material in the receptacle into the recesses in the workpiece.

In accordance with further features of the invention, the feed means and the actuator are advantageously provided on the support arm.

In accordance with another feature of the present invention, the receptacle has a mouth or open end and a closed end opposite thereto. In addition, the container is pivotably connected to the support arm for rotation about a pivot axis. The actuator preferably includes a turning mechanism operatively linked to the container for rotating the container about the pivot axis so that during the discharge phase of an operating cycle the closed end of the receptacle is located at a distance from the rotation axis which is smaller than the distance between the open end of the receptacle and the rotation axis. Preferably, the open end of the container is disposed between the rotation axis and the closed end of the container during the injection phase, the closed end being disposed between the rotation axis and the open end of the receptacle during the discharge phase.

In accordance with yet another feature of the invention, the container has a center of gravity disposed on a side of the pivot axis opposite the open end of the receptacle, whereby rotation of the support arm and the container about the rotation axis at a high angular velocity causes the receptacle to assume a first orientation in which the open end and the closed end are aligned along a direction perpendicular to the rotation axis, with the open end of the receptacle being disposed between the rotation axis and the closed end.

Preferably, the actuator includes a gear floatingly mounted to either the drive or the rotary support arm. The actuator includes a rotary power transmission train operatively coupled at one end to the floating gear and at an opposite end to the container. The actuator includes a braking mechanism for slowing the rotation rate of the floating gear. The operation of the braking mechanism during the rotation of the support arm and container about the rotation axis results in a rotation of the container about the pivot axis from a first orientation during the injection phase of an operating cycle to a second orientation during the discharge phase of an operating cycle.

The rotary power transmission train more particularly includes an additional gear rigid with the container and a shaft extending parallel to the support arm. The shaft is rotatably mounted to the support arm and has a worm thread engageable with teeth of the additional gear.

Pursuant to further particular features of the invention, the actuator includes limiting means for providing a limited range of angles through which the additional gear can rotate, the limiting means advantageously including an indent or cutout on an edge of the additional gear for preventing engagement of the additional gear with the worm thread of said shaft. The shaft may be provided at opposite ends with worm threads engageable with respective gears.

Where the support arm and container are disposed within a housing mounted to the frame, the braking mechanism advantageously includes a braking shaft having a first end fixed to the floating gear and a second end disposed outside of the housing. The braking mechanism includes means such as a clutch engageable with the second end of the braking shaft for slowing the rotation speed thereof. Generally the housing defines a vacuum chamber and the braking shaft is advantageously journaled in a vacuum bearing disposed in an opening in the housing.

Pursuant to a specific embodiment of the present invention, the drive includes a drive shaft and shiftable support means are provided for mounting the support arm and the drive shaft to the frame. A compensation mechanism, for example, in the form of a plurality of leaf springs is provided for restoring the drive shaft to a central position upon a shifting of the drive shaft in a response to a load imbalance. To accomodate the lateral shifting of the drive shaft, as well as of the support arm and container, the braking shaft advantageously includes a plurality of shaft portions connected to each other by universal couplings.

In a specific embodiment of the present invention, the retainer element includes a workpiece holder removably insertable into the container. The workpiece holder includes an elongate bore with an enlargement at one end for receiving the workpiece. The workpiece holder may be provided with screens for keeping the workpiece within the bore enlargement. In the case wherein the feed means includes a reservoir in the support arm with an outlet on a side of the reservoir opposite the rotation axis, the bore in the workpiece holder includes a second enlargement in the form of a funnel at an end of the workpiece holder opposite the first enlargement. The funnel-shape bore enlargement is juxtaposable to the outlet of the reservoir during the injection phase of an operating cycle.

A method for filling recesses in a workpiece with a metallic substances comprises, in accordance with the present invention, the steps of (a) placing the workpiece in a container having an open side and a closed side opposed thereto, (b) filling the container at least partially full with a liquified metal and (c) rotating the container about a rotation axis while simultaneously maintaining the container in a first orientation so that the distance between the open end of the container and the rotation axis is less than the distance between the closed end of the container and the rotation axis. Centripetal acceleration of the container and the liquified metal during the rotating step pressurizes the metal to thereby force the metal into the recesses in the workpiece. The method further comprises the steps of (d) pivoting the container to a second orientation so that the distance between the closed end of the container and the rotation axis is less than the distance between the open end of the container and the rotation axis, (e) revolving the container about the rotation axis upon completion of the pivoting step while simultaneously maintaining the container in the second orientation, and (f) holding the workpiece in the container at least during the pivoting and revolving steps so that the workpiece remains in the container while free liquified metal is discharged or ejected therefrom.

In accordance with further, more particular, features of the invention, a vacuum is created in the container prior to the filling step, and a retaining force is exerted on the workpiece to hold the same within the liquified metal in the container during the rotating step. Preferably, the workpiece is held proximately to the closed end of the container during the rotation step.

Pursuant to an advantageous embodiment of the invention, the workpiece is placed into the container by first inserting the workpiece into a workpiece holder and subsequently inserting the holder into the container. The holder is provided with a retainer element for exerting the retaining force on the workpiece. The retainer element advantageously taking the form of a screen.

The filling step preferably includes the steps of (i) rotating the container about the rotation axis while simultaneously maintaining the container in the first orientation and (ii) conducting the liquified metal to the open end of the container from a reservoir located at a distance from the rotation axis smaller than the distance between the container and the rotation axis. Preferably, the method further comprises putting solid particles of the metal in the reservoir and heating the particles to liquify the metal, the steps of putting and heating being executed prior to the step of filling.

It is advantageous to perform the pivoting step during the rotating step, whereby the container is continuously swung or rotated about the rotation axis during the rotating, pivoting and revolving steps. The pivoting step advantageously comprises the step of applying a braking force to a gear rotatably coupled to a rotary tramission train extending to the container.

In a method in accordance with the present invention, a large number of ceramic workpiece bodies may be simultaneously injected with lead to form capacitor electrode plates therein. Owing to the use of centripetal acceleration to pressurize the liquified metal (e.g., lead), a greater degree of penetration or injection is achieveable, thereby facilitating the production of multilayer capacitors having a lower failure rate. Moreover, the injection process can be accomplished in a shorter period of time than with conventional dipping methods, whereby the amount of metal from the terminal portions of a capacitor piece can be minimized. It is to be noted, moreover, that the degree of dissolving of terminal material can be decreased by increasing the rotation rate of the support arm or boom to thereby decrease the residence time of the workpieces in the molten metal.

The use of a workpiece holder or other means to retain the workpiece in proximity to the closed end of the pressurization recess or container receptacle results in the maximization of the pressure applied to the lead during the injection process.

Another, especially significant, advantage of the present invention is that workpieces which have been injected with a liquified metal have outer surfaces which are substantially free of the liquified metal and of metal oxides. Thus, there is no need to subject the workpieces to a cleaning operation upon the completion of the injection and discharge phases of an operating cycle.

In accordance with a particular feature of the invention, liquified metal is fed to the receptacle in the container or carrier member from a reservoir located within the support arm or boom. A duct having a small transverse dimension relative to the breadth of the reservoirs guides liquified metal therefrom to the mouth or open end of the receptacle or pressurization recess during an injection phase of an operating cycle. The spinning of the support arm about the rotation axis causes contaminants or dross, e.g. metal oxides, to separate from the liquified metal in the reservoir so that the contaminants lie closer to the rotation axis and so that the liquified metal leaves the reservoir and fills the receptacle in the container or carrier substantially prior to the transfer of any dross between the reservoir and the carrier receptacle. In accordance with the invention, the distance between the dross and the workpieces in the workpiece holder is maximized, thereby substantially decreasing if not eliminating, the possibility that the contaminants originally present in the charge material in the reservoir will be deposited on the outer surfaces of the workpiece bodies. Moreover, because the injection is accomplished at a high pressure in accordance with the invention, the residence time of the workpieces in the molten material is substantially reduced, thereby decreasing the amount of metal oxides which are formed (in applications where the injected material is metal) in the container receptacle during the injection phase.

Pursuant to a particular feature of the present invention, a charge of powdered talc is deposited in the container prior to the filling of the container with the liquified material. Where a multiplicity of separate workpieces are placed in the container, the powdered talc serves to prevent possibly damaging impacts or collisions between the different workpieces. In addition, the talc forms a layer on the different workpieces, upon a sufficient mixing of the talc and the workpieces, to prevent the fusion of the workpieces and to prevent the wetting of the external surfaces thereof with the molten metal. Yet another function of the powered talc is to filter the molten metal, particularly molten lead, and to clean it of impurities such as metal oxides.

It is to be noted that the ejection of the liquified metal from the container receptacle during the discharge phase of an operating cycle serves to clean the external surfaces of the workpiece bodies of liquified metal.

DETAILED DESCRIPTION OF THE INVENTION

Figure 1:
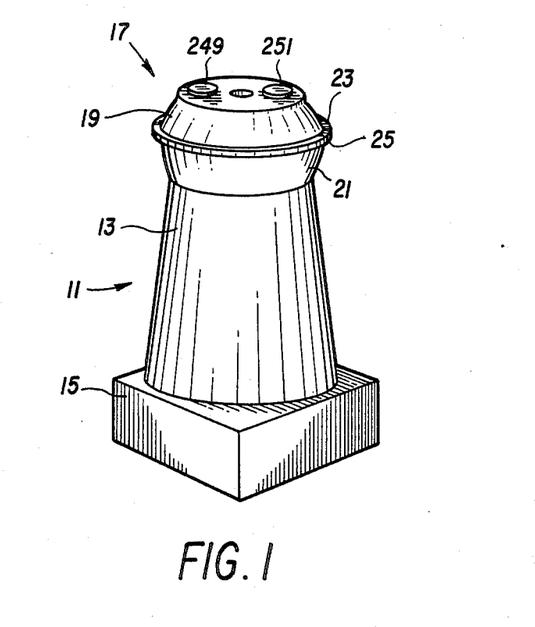
FIG. 1 is a perspective view of the housing of an injection apparatus in accordance with the present invention.

As illustrated in FIG. 1, a centrifugal metal injector in accordance with the invention comprises a frame or housing 11 having a conical bottom portion 13 supported and rigid with a prismatic water tank 15. The frame or housing includes an upper portion 17 defining a vacuum chamber having a flattened spherical shape. The upper portion 17 of the housing in turn comprises a lower vacuum chamber shell half 21 rigidly but removably secured to conical housing portion 13 and an upper vacuum chamber shell half 19. Shell halves 19 and 21 are bolted to one another along respective circumferential flanges 23 and 25.

Figure 2:
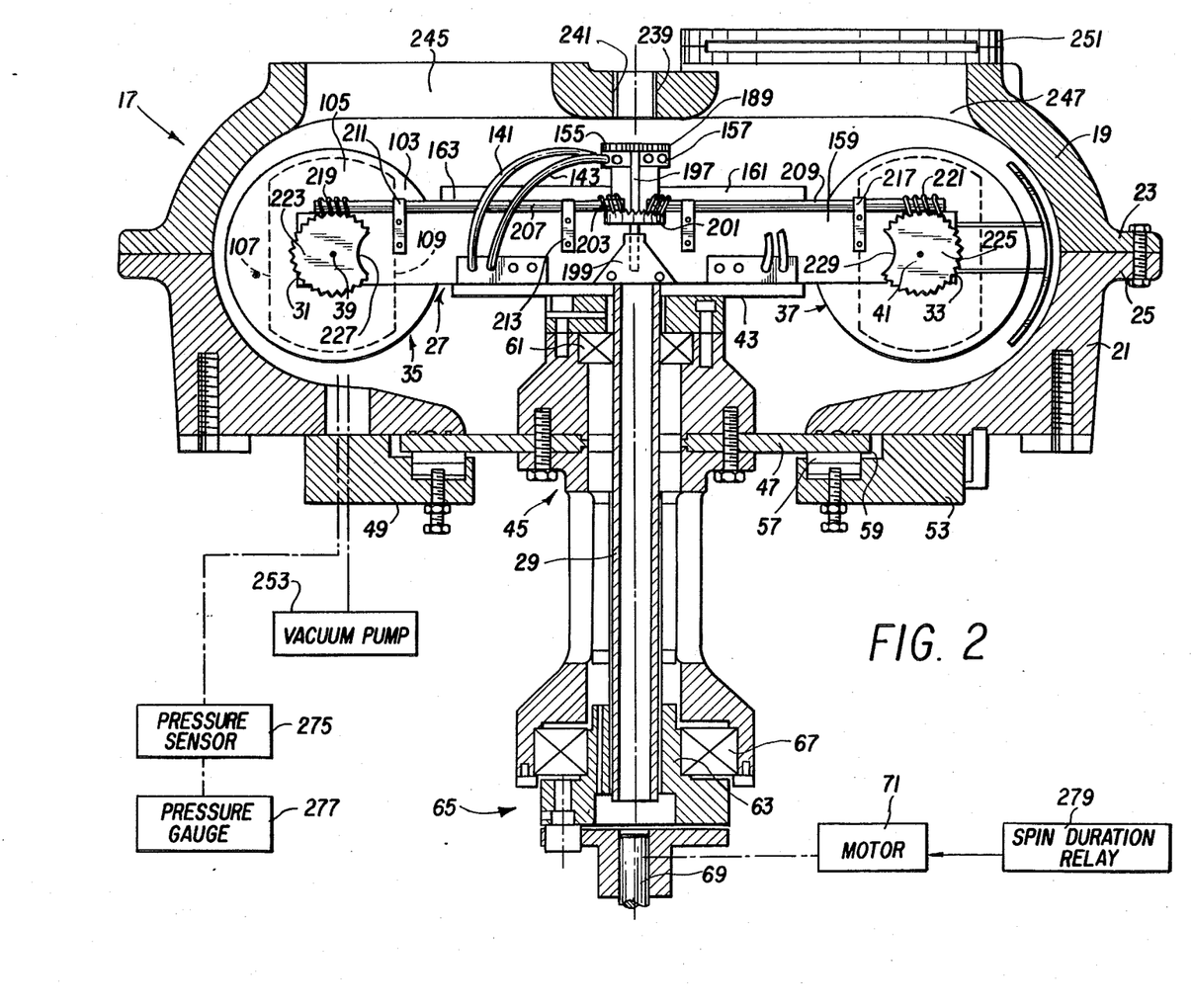
FIG. 2 is a vertical cross-section view taken through the upper portion of the injection apparatus illustrated in FIG. 1, showing a rotatable boom or support arm and carrier members or containers in elevation.
Figure 3:
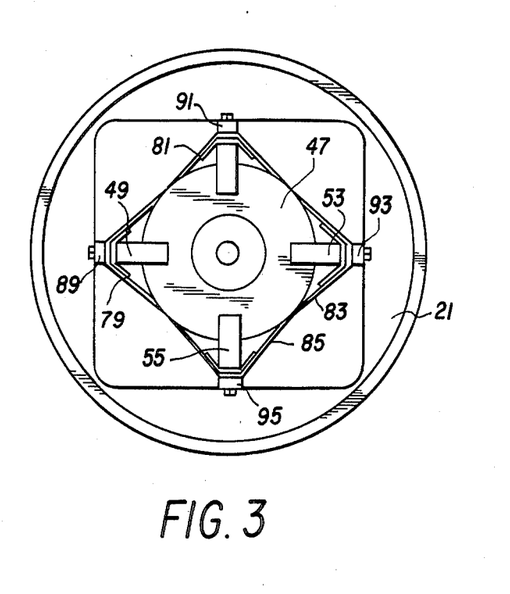
FIG. 3 is a bottom elevational view of a lower vacuum chamber housing shell half illustrated in FIG. 1, showing an assembly for compenstating load imbalances in the injection apparatus.

As illustrated in FIG. 2, vacuum chamber shell halves 19 and 21 enclose or house a rotary or centrifugal pressurization assembly comprising a boom or rotary support arm 27 rigidly coupled to a hollow drive shaft 29. Boom or support arm 27 is symmetrically disposed with respect to drive shaft 29 and has a pair of free ends 31 and 33 to which respective carriers or containers 35 and 37 are mounted for rotation about respective pivot axes 39 and 41. Rotary support arm 27 and carriers 35 and 37 are rotatably mounted by means of a disc bearing 43 on a laterally shiftable support structure 45. Support structure 45 includes an annular disc 47 having a periphery slidably secured to vacuum chamber shell half 21 by means of a plurality of brackets 49, 51, 53 and 55 (FIG. 3). The sliding motion of disc 47 with respect to shell halves 21 and brackets 49, 51, 51 and 55 is damped by a multiplicity of friction pads equal in number to the clamping brackets 49, 51, 53 and 55 and mounted to respective brackets. Friction pads 57 engage disc 47 within respective slots defined by brackets 49, 51, 53 and 55 and by a lower surface of shell half 21.

Drive shaft 29 is rotatably journaled within support structure 45 by means of a first bearing 61 at an upper end of the drive shaft. At a lower end, the drive shaft is keyed to a collar member 63 of a universal coupling joint 65, collar member 63 in turn being rotatably journaled within support structure 45 by means of a second rotary bearing 67 at an input end universal transmission joint 65 is connected to an output shaft 69 of a drive motor 71. Motor 71 is located within conical lower portion 13 of housing 11 (FIG. 1). As illustrated in FIG. 3, four leaf springs 79, 81, 83 and 85 are fastened at opposite end to support structure 45 and are fixed at respective intermediate sections to brackets 49, 51, 53 and 55 by respective clamping elements 89, 91, 93, and 95. Leaf springs 79, 81, 83 and 85 serve to compensate for oscillations of support structure 45, drive shaft 29 and support arm 27. The leaf springs tend to restore the support structure to a central position and act together with friction pads 57 to stabilize or damp the lateral motion of the support structure and the components carried thereby.

Universal coupling 65 enables the transmission of rotary power from a laterally stationary output shaft, namely, output shaft 69 laterally shiftable drive shaft 29.

Figure 4:
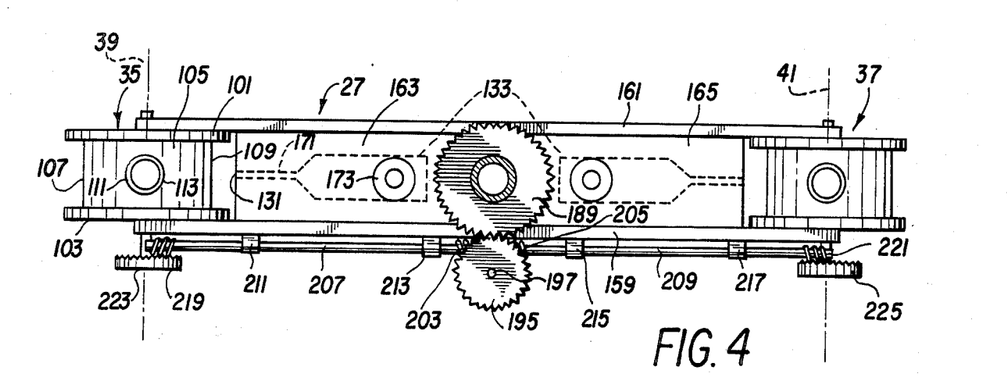
FIGS. 4 and 4a are top views of the rotary support arm and container bodies illustrated in FIG. 2.
Figure 4A:
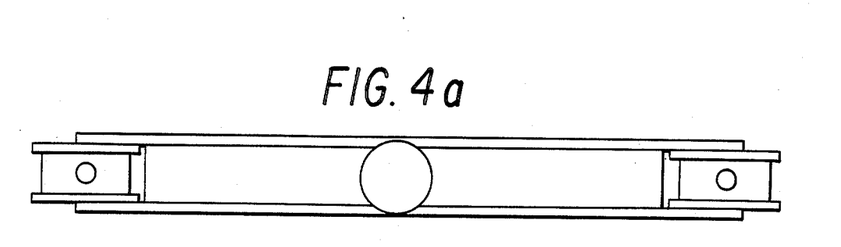

As illustrated in FIGS. 2 and 4, containers or carrier members 35 and 37 each comprise a pair of circular plates 101 and 103 between which is sandwiched a container body 105 made of a thermally insulating material and taking the form of a cylinder truncated along a pair of opposing planar surfaces 107 and 109. Each container body 105 is provided with an elongate bore 111 substantially parallel to planar surfaces 107 and 109. A test-tube-shaped liner element or capsule 113 is disposed within each bore 111, the capsule defining a substantially cylindrical pressurization recess or receptacle for the reception of a workpiece holder 115 (see FIG. 5).

Figure 5:
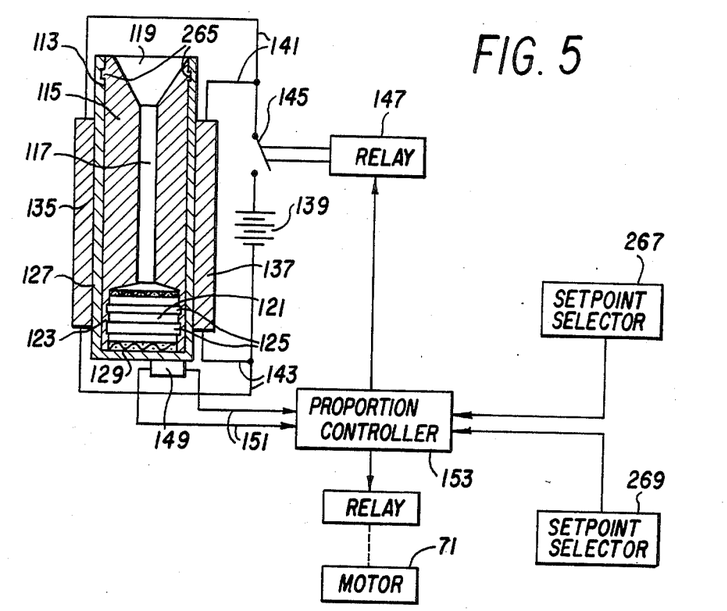
FIG. 5 is a cross-sectional view of a workpiece holder and capsule mounted in a container body of FIGS. 2 and 4.

As illustrated in FIG. 5, workpiece holder 115 is a substantially solid metal cylinder having an axial bore 117 opening into a funnel-shaped enlargement 119 at one end and communicating with a substantially cylindrical enlargement 121 at an opposite end. Cylindrical enlargement 121 is defined by an annular flange 123 at an end of workpiece holder 115, flange 123 being provided on an inner surface with a plurality of circumferential grooves 125 for receiving retainer screens 127 and 129. Screen 127 is disposed at an inner end of cylindrical enlargement 121 for preventing workpieces, such as ceramic bodies to be made into multilayer capacitors, from floating to the top of a column of liquified metal such as lead. Screen 129 is disposed at an outer end of cylindrical cavity or enlargement 121 for retaining workpieces within the enlargement during an insertion and during a subsequent removal of workpiece holder 115 from capsule 113. It is to be 13 noted that screen 127 serves to hold the workpieces in close proximity to a closed end of capsule 113 opposite a mouth or open end thereof.

Figure 6:
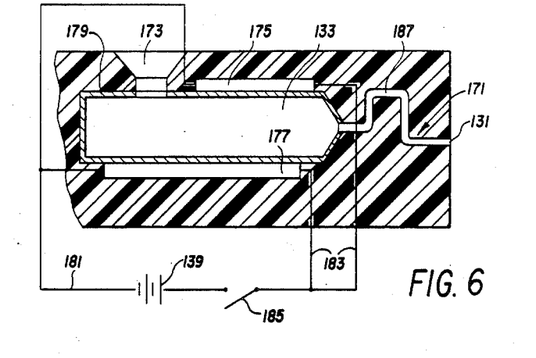
FIG. 6 is a cross-sectional view through a portion of the support arm of FIGS. 2 and 4, showing a reservoir for the liquification of a metallic or other substance.

Funnel-shaped enlargement 119 serves to catch and guide droplets of liquified metal, in particular liquified lead, from an outlet 131 of a reservoir 133 see (FIG. 6). As shown in FIG. 5, a plurality of resistive elements 135 and 137 are disposed within thermally insulating container body 105 in contact with capsule 113. Capsule 113 consists essentially of a thermally conductive material, whereby heat energy generated by resistive elements 135 and 137 is conducted to liquified metal within cylindrical enlargement 121 and bore 117 via the wall of capsule 113 and workpiece holder 115. Resistive elements 135 and 137 are connectable to a power supply 139 via leads 141 and 143 and a switch 145. Switch 145 is automatically opened by a relay 147 in the event that the temperature in capsule 113 exceeds a predetermined limit. The temperature of capsule 113 and of the liquified metal therein is detected by a temperature sensor 149 having a pair of output leads 151 connected to a control unit 153 in turn operatively coupled to relay 147.

As illustrated in FIG. 2, leads 141 and 143 extend through apertures 155 in an annular port member 157 rigidly secured to drive shaft 29. Leads 141 and 143 extend through hollow drive shaft 29 to a slip ring disc (not illustrated) disposed within conical portion 13 of housing 11 (see FIG. 1). The slip ring disc has a multiplicity of separate conductive slip rings connected to heated elements (e.g, 135 and 137) and sensors (e.g., 149) in container bodies 105 of containers or carriers 35 and 37 via leads (e.g., 151) extending through hollow drive shaft 29. FIG. 2 of the drawing illustrates only two leads 141 and 143 on support arm 27, other leads being omitted for purposes of clarity.

As illustrated in FIG. 4, support arm 27 comprises a pair of generally rectangular support plates 159 and 161 secured to a pair of spacer blocks 163 and 165 which have substantially the same width as containers or carriers 35 and 37. Containers 35 and 37 are rotatably mounted to the free ends of plates 159 and 163 for angular motion about respective pivot axes 167 and 169.

Each spacer block 163 and 165 advantageously consists essentially of a thermally insulating material and is provided with a respective metal-lined chamber 133 (see also FIG. 6) for storing a reservoir or charge of liquified metal or other material to be introduced into capsules 113 of containers 35 and 37. Each chamber or reservoir 133 is provided with an outflow duct 171 communicating with the respective reservoir outlet 131. As illustrated in FIGS. 4 and 6, each spacer block 163 and 165 is provided with a respective tunnel-shaped opening 173 communicating with the respective reservoir 133. Prior to an operating cycle, tin-coated lead pellets are introduced into chambers 133 via openings 173 in a number sufficient to enable the filling of the capsules 113, and in particular enlargement 121 and bore 117, to a predetermined level.

As illustrated in FIG. 6, a pair of resistive elements 175 and 177 are imbedded in each spacer block 163 and 165 in contact with the metal lining 179 of the respective reservoir or chamber 133. Resistive elements 175 and 177 are connectable to power source 139 via leads 181 and 183 and a relay operated switch 185. Prior to a rotation of drive shaft 29 and support arm 27 about an axis of rotation 187 (FIG. 2) defined by shaft 29, a measured number of tin-coated lead pellets is introduced into the reservoir 133 and switch 185 is closed. Heat energy generated by resistive elements 175 and 177 is conducted through metal lining 179 to melt the lead pellets and thereby form a pool of liquified metal within the reservoir. As shown in FIG. 6, duct 171 is formed with a loop 187 functioning as a trap.

As illustrated in FIGS. 2 and 4, a gear 189 is floatingly, i.e., rotatably, mounted to drive shaft 29 via annular port member 157. Gear 189 is coaxial with drive shaft 29 and is provided with a multiplicity of teeth 191 which mesh with the teeth 193 of a second gear 195 coplanar with gear 189 and eccentrically disposed with respect to drive shaft 29. Gear 195 is connected to a rod 197 rotatably secured to support arm 27 by a bracket member 199. Attached to rod 197 and spaced from gear 195 is a third gear 201 provided on an upper surface with a circular array of upwardly facing teeth engaging worm threads 203 and 205 on respective shafts 207 and 209 rotatably mounted to rectangular plate 259 of support arm 27 by means of respective pair of journaling brackets 211, 213 and 215, 217. Shafts 207 and 209 extend along respective halves of support arm 27 from the region of drive shaft 29 to the regions of containers or carriers 35 and 37. At their outer ends shafts 207 and 209 are provided with respective worm threads 219 and 221 which mesh with the inwardly directed teeth of respective gears 223 and 225 rigidly secured to respective containers 35 and 37 for rotational motion about pivot axes 39 and 41. Each gear 223 and 225 is provided with a respective indent or cutout 227 and 229 which serves to limit the amount of rotation of the respective gear.

Figure 7:
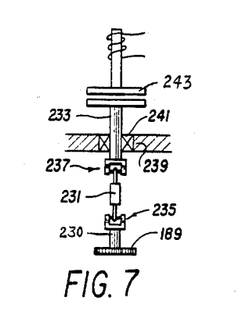
FIG. 7 is a partially cross-sectional view of a braking shaft extending through an upper vacuum chamber housing shell half illustrated in FIGS. 1 and 2.

As illustrated in FIGS. 2 and 7, floating gear 189 is rigidly connected to one end of a braking shaft 237 comprising three shaft portions 230, 231 and 233 connected to one another by a pair of universal joints 235 and 237. One of the shaft portions, e.g., shaft portion 233, traverses an opening 239 in vacuum chamber shell half 19 and is rotatably journaled in opening 239 by a vacuum bearing 241. A brake actuator such as an electromagnetically operated clutch plate 243 is disposed on upper shell half 19 for engaging braking shaft 237 and slowing the rotation of gear 189.

Clutch plate 243, braking shaft 237, gear 189, shafts 207 and 209 and gears 223 and 225 form an actuator assembly coupled to carriers 35 and 37 for pivoting the same from a first angular orientation, in which the mouth and the closed end of capsule 113 are aligned in a direction perpendicular to the axis of rotation of arm 27 and with the mouth of capsule 113 disposed between the closed end of the capsule and the rotation axis, to a second angular orientation in which the mouth and the closed end of capsule 113 are aligned in the direction perpendicular to the rotation axis and with the closed end of capsule 113 disposed between the rotation axis and the mouth of the capsule. The actuator assembly's action serves to eject free liquified metal from capsule 113 during a discharge phase of an operating cycle upon an injection of a portion of the liquified metal in capsule 113 into the recess in the workpieces disposed in capsule 113.

An operating cycle of centrifugal injection apparatus in accordance with the invention includes an injection phase succeeded by a discharge or ejection phase. During the injection phase of an operating cycle, support arm 27 and containers or carriers 35 and 37 are rotated about the axis of rotation of drive shaft 29 at angular speeds in excess of 1,000 rpm. During the injection phase, floating gear 189 is fixed relative to a rotary power transmission train including gear 195, shaft or rod 197, gear 201, shaft 207, and gear 223. Upon the application of a braking force to floating gear 189 by means of braking shaft 237, a relative rate of rotation arises between gears 189 and 195. Thus, the application of a braking force to floating gear 189 causes a rotary force to be transmitted through shafts 207 and 209 to gears 223 and 225.

As illustrated in FIG. 2, upper shell half 19 is provided with a pair of openings 245 and 247 for providing access to containers 35 and 37 for loading and unloading capsules 113 with workpieces 115. Openings 245 and 247 also allow access to tunnel-shaped openings 173 in spacer blocks 163 and 165, whereby charges of tin-coated lead pellets may be introduced into the reservoir chambers 133. Openings 245 and 247 are covered by respective vacuum-tight lids 249 and 251 (see FIG. 1). Lids 249 and 251 are hingedly secured to upper shell half 19.

Shell halves 19 and 21 are vacuum-tight aluminum castings. A vacuum pump 253 is connected to shell half 21 and communicates with the vacuum chamber defined by shell halves 19 and 21.

A control system for the centrifugal injection apparatus includes four proportional controllers such as controller 153 shown in FIG. 5. Each controller is assigned to a capsule 113 of container or carrier member 35 or 37 or to a reservoir 133 in spacer block 163 or 165. Each proportional controller activates a respective first relay such as relay 147 in FIG. 5 for controlling the conduction of electrical power to one or more resistive elements in thermal contact with the respective capsule 113 or metallic lining 179 (FIG. 6). Each controller is further connected at an output to a respective second relay, such as a relay 255 shown in FIG. 5, which is operatively connected to the drive motor 71 for disabling the operation thereof if the temperature of the respective capsule 113 or metallic lining 179 is not above a predetermined threshold temperature. The operational temperatures of the reservoirs and capsules are preferably set at 20° to 30° C. above the melting point of the metal or alloy being injected into workpiece recesses.

Figure 8:
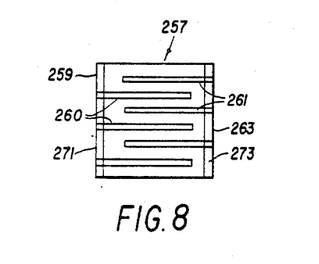
FIG. 8 is a schematic cross-sectional view of a small workpiece having recesses or voids filled by the method and apparatus of the invention.

A first step in operating the centrifugal metal injection apparatus is concerned with loading the workpiece holders 115 with a desired number of ceramic blanks or workpieces. As illustrated in FIG. 8, a ceramic workpiece 257 has a first array of plate-shaped recesses or cavities 260 which are substantially coextensive with one another and extend from one side face 259 of the workpiece body. The workpiece has a second array of plate-shaped recesses or cavities 261 generally coextensive with one another and extending inwardly from an end face 263 or opposite face 259 of the ceramic workpiece. It is to be noted that since the thin plate-shaped recesses 260 and 261 are each connected to only one surface or face 259 or 263 of the ceramic workpiece 257, it is highly advisable to remove all gases from the recesses in order to facilitate the filling of the recesses with liquified material.

To load a workpiece holder 115, the holder is oriented in a vertical direction with the cylindrical enlargement or cavity 121 facing upwardly. The inner screen 127 is then seated in a groove 125 which is chosen to accommodate the number of capacitor blanks to be injected. The blanks are then inserted into the cylindrical enlargement 121 and the outer screen 129 is seated in an outermost circumferential groove 125.

The loaded workpiece holder 115 is then inserted into a respective capsule 113. As illustrated in FIG. 5, the workpiece holder is provided in a region about tunnel-shaped enlargement 119 with a plurality of outwardly projecting lugs 265 which engage in respective recesses or slots in the respective capsule 113.

To determine the correct weight of metal necessary for completely filling an injection capsule 113 without overflow, the following procedure is performed with the workpiece holder 115 and a sample load of workpieces in place within the respective capsule 113. A 50-ml beaker is filled with approximately 40 ml of water. The filled beaker is weighed, note being made of the weight in grams. The injection capsule 113 with its respective holder 115 mounted therein is disposed in an upright position, i.e., in a vertical orientation with the open end or mouth of capsule 113 facing upwardly. Water is transferred to the capsule from the beaker by means of an eye dropper until the capsule is filled to within 0.125" of the top surface of the respective container 35 or 37. The beaker is then again weighed and the weight loss noted, this weight loss being the weight of the water in the capsule. This weight is then multiplied by the density of the metal being used to obtain the weight of the metal charge required for a complete fill. The required weight is measured out, the metal being prepared as pellets or cut rod pieces to allow rapid disposition into the metal-lined reservoirs 133 of spacer blocks 163 and 165. The water is removed from the injection capsule 113 by the use of a syringe. The capsule is heated (e.g., by resistive elements 135 and 137) to evaporate all moisture.

Upon the disposition of the metal pellets within reservoirs 133, as illustrated in FIG. 8B, the resistive elements 175 and 177 of the reservoirs 133 are connected by the respective proportional controllers via relay-operated switches to the power source 139.

As illustrated in FIG. 5, each proportional controller, e.g., controller 153, is connected to a pair of manually actuatable setpoint selectors 267 and 269. One setpoint selector 267 is used for setting the operational temperature of the respective capsule 113 or reservoir 133, while the other setpoint selector 269 is used to set the lowest permissible temperature of the capsule or resevoir. The controller acts through its respective relay and switch (e.g., 153, 147 and 145) to maintain the temperature of the associated capsule 113 or reservoir 133 at approximately the temperature set by means of selector 267. In addition, if the controller determines that the temperature of the associated capsule or reservoir has fallen below the threshold temperature set by selector 269, the controller acts to disable motor 71 and thus terminate the spinning of the centrifugal metal injector. The reservoirs 133 are advantageously heated to a temperature which is approximately 10° C. above the temperature of the associated capsule 113 in order to accommodate a temperature drop during transfer of the molten metal from the reservoir 133 to the capsule 113. The lower limit or guide temperature set by selector 269 is advantageously chosen to be approximately 5° C. above the melting point of the metal or alloy being injected. The operating temperature must be limited in order to minimize the amount of material which dissolves from terminal contact layers 271 and 273 formed at the end faces 259 and 263 of a ceramic workpiece 257.

Upon the insertion of the loaded workpiece holders 115 into their respective capsules 113 in containers or carrier members 35 and 37 and upon the disposition of a preweighed amount of metal in reservoirs 133 (see FIG. 9B), lids 249 and 251 are closed and sealed. Vacuum pump 253 is then actuated to evacuate the air from the vacuum chamber within shell halves 19 and 21. As illustrated FIG. 2, a pressure sensor 275 communicates with the vacuum chamber for detecting the degree of the vacuum created therein. The pressure sensor 275 is then in turn connected to a vacuum gauge 277 so that an operator can monitor the pressure within the vacuum chamber.

As further illustrated in FIG. 2, a spin duration relay or other timing device is operatively connected to motor 71 for controlling the duration of a spin cycle and for determining the interval between the time that the application of rotary energy to drive shaft 29 is terminated and the time that a retarding force is applied to the breaking shaft 227 (FIG. 7) for slowing the rotation of gear 189 and thereby causing the rotation of containers 35 and 37 about their respective pivot axes 39 and 41. Advantageously, the duration relay is dial-adjustable from zero to 99.9 seconds.

With respect to the loading of workpiece holder 15, it is to be noted that the workpieces are placed into cylindrical enlargement 121 advantageously with a charge of powdered talc or other similar inert powdered material such as silicon or aluminum powder. It is only necessary that the particle size of the powdered material is sufficiently large to ensure that the powder does not enter the minute recesses in the workpieces.

Upon the melting of the metal pellets within reservoirs 133 and upon the attainment of a predetermined vacuum within the vacuum chamber, motor 71 is energized to commence the rotation of output shaft, universal coupling 65, drive shaft 29, support arm 27 and containers 35 and 37 about the rotation axis of the drive shaft. Upon the rotation of the centrifugal metal injection apparatus, i.e., the support arm 27 and containers 35 and 37, at a predetermined angular velocity, containers 35 and 37 assume the orientations illustrated in FIG. 9C. In this loading and injecting orientation or configuration, the open end of capsule 113 and the tunnel-shaped enlargement 119 of workpiece holder 115 face the outlet 131 of the respective metal storing reservoir 133. In this orientation, the open end of the capsule is located between the rotation axis and the closed end of the capsule along a direction extending perpendicularly to the rotation axis. As illustrated in FIG. 9C, liquified metal from the reservoirs 133 has begun to flow along the output ducts 171 to the outlets 131.

Figure 9A:
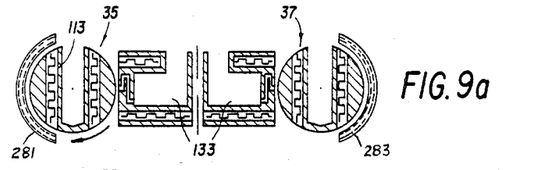
FIGS. 9A–9H are schematic cross-sectional views of the support arm and container bodies of FIGS. 2 and 4, showing a sequence of operating steps in accordance with the invention.
Figure 9B:
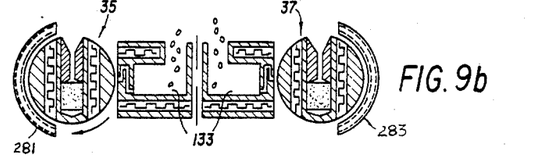
Figure 9C:
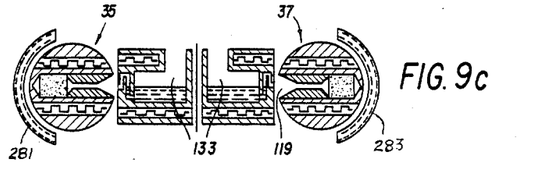
Figure 9D:
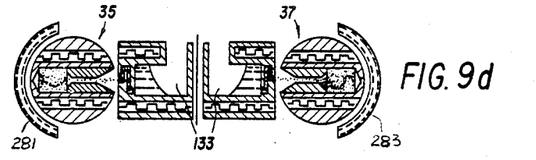

As illustrated in FIG. 9D, liquified metal from the reservoirs 133 passes through ducts 171 and traverses a gap between the duct outlets 131 and the funnel-shaped enlargements o cavities 119 in the workpiece holders 115. The molten metal fills the cylindrical cavities or enlargments 121 at the closed ends of the container capsules 113 and subsequently fills bores 117 in workpiece holders 115.

Figure 9E:
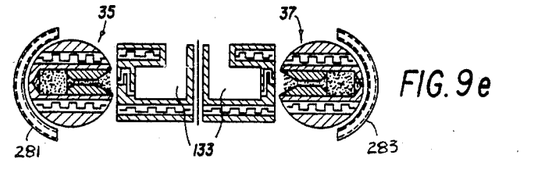
Figure 9F:
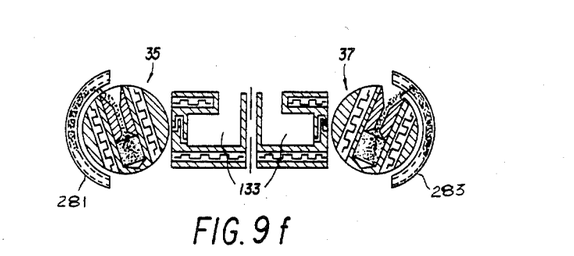

As illustrated in FIG. 9E, the entire charge of liquified metal in each reservoir 133 moves outwardly to fill the bore 117 and enlargements or cavities 119 and 121 in the respective workpiece. The centrifugal metal injection apparatus continues to rotate during an injection phase of an operating cycle, the duration of the phase being determined by the timing relay 279 (FIG. 2). At the end of a predetermined interval, timing relay 279 causes motor 71 to cease the rotation of output shaft 69 and the concomitant rotation of the centrifugal injection apparatus. Upon the elapse of another predetermined interval, the breaking mechanism (e.g., an electromagetically operated clutch) is automatically actuated to slow the rotation of floating gear 189. As heretofore described, the slowing of floating gear 189 causes the rotation of containers 35 and 37 about their respective pivot axes 39 and 41. As illustrated in FIG. 9F, the rotation of containers 35 and 37 to an orientation in which the closed end of the respective capsule 113 is closer to the rotation axis than the open end of the capsule enables the flow of the liquified metal from the workpiece holder 115.

As illustrated in FIG. 2 and FIGS. 9A-9H, the centrifugal injection apparatus in accordance with the invention is provided with a pair of spent metal receivers or catches 281 and 283 removably attached to the support arm 27. Liquified metal ejected from the workpiece holders 115 is captured by the receivers 281 and 283 and solidifies thereon.

Figure 9G:
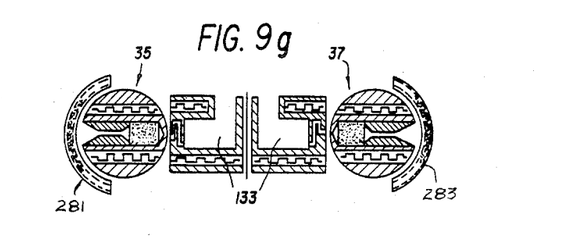

Generally, the disabling of motor 71 and the concomitant annular deceleration of drive shaft 29, support arm 27 and containers 35 and 37 occur at the same time that the electromagnetic clutch is operated to slow the rotation of floating gear 189. This procedure results in a most energetic and efficacious removal of liquified metal from the external surfaces of the workpiece bodies. As illustrated in FIG. 9G, this procedure may result in a substantially complete reversal of the orientation of containers 35 and 37 so that the closed end of each capsule 113 is disposed between the open end of the capsule and the axis of rotation of the device.

Figure 9H:
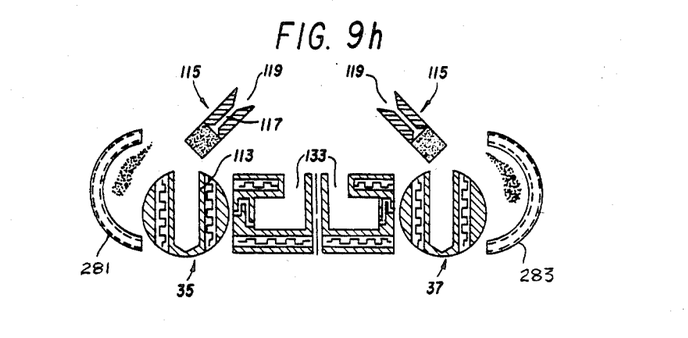

Upon the cessation of rotation, containers 35 and 37 return to the orientations illustrated in FIGS. 9A, 9B, and 9H. For the container bodies to automatically assume this vertical orientation under the influence of gravity, each container body must have a center of gravity spaced from the respective pivot axis 39 and 41 and disposed on a side thereof opposite the open end of the capsule 113. Such a configuration of the container bodies 35 and 37 causes the same to assume the orientations illustrated in FIGS. 9C-9E upon the actuation of motor 71 (the clutch being deenergized).

As illustrated in FIG. 9H, upon the cessation of rotation, lids 249 and 251 (FIGS. 1 and 2) are opened to allow the removal of workpiece holders 115 from their respective capsules 113 and also to allow the removal of receivers 181 and 183.

Upon the loading of a workpiece holder with a multiplicity of ceramic bodies and an approximately equal volume of powdered talc or other inert powder, it is advantageous to tumble the charge (i.e., workpieces plus powder) for approximately five minutes.

Generally the spin time for the centrifugal metal injection apparatus will be under thirty seconds.

The height of the workpiece holders, and thus of the columns of molten metal contained therein during the injection phase of an operating cycle, is advanageously 3 inches. Bore 117 is approximately $\frac{1}{8}$ inch across, while cylindrical enlargement 121 has dimension of approximately $\frac{7}{8}$ by $1\frac{1}{2}$ inches. In the case of lead, such a column of the liquified metal results in approximately 200 psi pressure in the liquid at the closed ends of the capsules 113.

The centrifugal forces on the injected metal and on the ejected metal are not the same. During injection, the penetration force is caused by centrifugal force operating on the entire column of the liquid, which creates a hydraulic head. During spin-off or an ejection process, the force is operating only on the immediate particle of metal present, so there is no hydraulic effect. The metal within the thin cavities or voids within the workpieces is retained therein owing at least in part to surface tension forces.

It is to be noted that the flow of metal in an apparatus in accordance with the invention is such that the workpieces are isolated from metal oxides, dross or other surface contaminants. Metal oxides would adhere to the outer surfaces of the workpiece bodies and are difficult to remove. Oxides formed during the melting process in reservoirs 133 are the last materials to enter the capsules 113. The oxides are forced to the top of the melt owing to the differing effect of centrifugal force on materials of different densities. Accordingly, the oxides are the first to be dumped or ejected during a discharge phase of an operating cycle.

Although the invention has been described in terms of particular embodiments and applications, one of ordinary skill in the art, in light of this teaching, can generate additional embodiments and applications without departing from the spirit of or exceeding the scope of the claimed invention. Accordingly, it is to be understood that the descriptions and illustrations herein are profferred by way of example to illustrate the invention and should not be construed to limit the scope thereof.

What is claimed is:

1. An apparatus for injecting a first metal into thin plate-shaped recesses in a workpiece body to form electrode plates in a multilayer capacitor, said workpiece body having capacitor terminals formed of a second metal, said second metal having a higher melting point than the melting point of said first metal, said apparatus comprising:
   a frame;
   a boom rotatably mounted to said frame;
   drive means operatively linked to said boom for rotating same about an axis of rotation at a high speed, said boom having at least one free end spaced from said axis of rotation;

a carrier member pivotably mounted to said boom at said free end, said carrier member being provided with a pressurization recess having a mouth and a closed end opposite thereto;

retaining means disposable in said pressurization recess for retaining therein a multiplicity of workpiece bodies each formed with a plurality of thin plate-shaped recesses and having capacitor terminals formed of the second metal;

feed means provided on said boom for feeding the first metal in liquified form to said recess through said mouth;

heating means including heater elements disposed in said carrier member in juxtaposition to said pressurization recess for supplying thermal energy to the liquified first metal in said recess to maintain the first metal in liquified form during a metal injection phase of an operating cycle;

counterweight means operatively coupled to said boom for balancing the mass of said boom and said carrier means with respect to said axis of rotation; and actuator means operatively coupled to said carrier member for pivoting same from a first angular orientation, in which said mouth and said closed end are aligned in a direction perpendicular to said axis and with said mouth being disposed between said closed end and said axis, to a second angular orientation in which said mouth and said closed end are aligned in said direction and with said closed end being disposed between said axis and said mouth, whereby centripetal acceleration of said carrier member during said metal injection phase of an operating cycle causes a pressurization of the liquified first metal in said pressurization recess to force the first metal into said plate-shaped recesses of said ceramic bodies and whereby the liquified first metal is ejected from said pressurization recess during a discharge phase of an operating cycle.

2. The apparatus defined in claim 1 wherein said feed means includes reservoir means in said boom for storing a quantity of said first metal, said feed means further including a duct extending from said reservoir means to an outlet disposed on a side of said reservoir means opposite said axis, said outlet being juxtaposed to said mouth of said pressurization recess during said injection phase.

3. The apparatus defined in claim 2 wherein said reservoir means includes a storage chamber having a breadth dimension oriented generally parallel to said axis, said duct having a transverse dimension substantially smaller than said breadth dimension.

4. The apparatus defined in claim 3 wherein said duct has a trap.

5. The apparatus defined in claim 3, further comprising additional heating means including heater elements juxtaposed to said storage chamber for supplying thermal energy to convert a charge of said first metal from solid form to liquified form.

6. The apparatus defined in claim 2, further comprising additional heating means juxtaposed to said reservoir means for supplying thermal energy to convert a charge of said first metal from solid form to liquified form.

7. The apparatus defined in claim 2 wherein said pressurization recess is defined by a metallic substantially tube-shaped liner element inserted in a bore in said carrier member, said heater elements being in thermal contact with said liner element, said carrier member consisting essentially of a thermally insulating material.

8. The apparatus defined in claim 7, wherein said retaining means includes a workpiece holder removably insertable into said liner element.

9. The apparatus defined in claim 8 wherein said workpiece holder includes an elongate bore with a first enlargement at one end and a second enlargement at an opposite end.

10. The apparatus defined in claim 9 wherein said first enlargement is in the form of a funnel and is disposed at an end of said workpiece holder juxtaposed to said outlet of said duct during said injection phase.

11. The apparatus defined in claim 10 wherein said workpiece holder is provided with means for keeping said workpiece bodies within said second enlargement.

12. The apparatus defined in claim 11 wherein said means for keeping includes a pair of removable screens.

13. The apparatus defined in claim 8 wherein said workpiece holder contacts said liner element in an inserted state of said workpiece holder, said workpiece holder consisting essentially of a thermally conductive material.

14. The apparatus defined in claim 1 wherein said boom comprises a first boom portion having said free end and a second boom portion on an opposite side of said axis from said first boom portion, further comprising an additional carrier member pivotably connected to said second boom portion at an end thereof opposite said axis and said first boom portion, said counterweight means essentially comprising said second boom portion and said additional carrier member.

15. The apparatus defined in claim 1 wherein said carrier member has a center of gravity, said carrier member being pivotably mounted to said boom for swinging about a pivot axis, said center of gravity being spaced from said pivot axis.

16. The apparatus defined in claim 15 wherein said pivot axis passes through said pressurization recess and wherein said center of gravity is located on a side of said pivot axis opposite the mouth of said pressurization recess.

17. The apparatus defined in claim 16 wherein said actuator means includes a first gear rigidly mounted to said carrier member coaxially with said pivot axis, a second gear mounted to one of said boom and said drive means for rotation about said axis of rotation, rotation transmission means for transmitting rotary power from said second gear to said first gear upon a rotation of said second gear relative to said boom, and brake means for slowing the rotation rate of said second gear about said axis of rotation.

18. The apparatus defined in claim 17 wherein said rotation transmission means includes a shaft extending parallel to, and rotatably mounted to, said boom and provided at an end with a worm thread engageable with teeth of said first gear.

19. The apparatus defined in claim 18 wherein said actuator means includes limiting means for providing a limited range of angles through which said first gear can rotate.

20. The apparatus defined in claim 19 wherein said limiting means includes an indent on an edge of said first gear for preventing engagement of said first gear with said worm thread.

21. The apparatus defined in claim 18 wherein said shaft is provided at opposite ends with worm threads engageable with respective gears.

22. The apparatus defined in claim 17 further comprising a housing mounted to said frame, said boom being disposed within said housing.

23. The apparatus defined in claim 22 wherein said brake means includes a braking shaft fixed at a first end to said second gear, said shaft traversing an opening in said housing so that a second end of said shaft opposite said first end is disposed outside of said housing, said brake means further including means engageable with said second end of said shaft for slowing the rotation speed thereof.

24. The apparatus defined in claim 23, further comprising air pumping means connectable to said housing for forming a vacuum therein, said shaft being journaled in a vacuum bearing in said opening.

25. The apparatus defined in claim 23 wherein said drive means includes a drive shaft, further comprising shiftable support means for mounting said boom and said drive shaft to said frame and compensation means connected to said support means for compensating inbalances in loading of said drive means and for restoring said drive shaft to a central position upon a shifting of the drive shaft therefrom in response to a load inbalance.

26. The apparatus defined in claim 25 wherein said braking shaft includes three shaft portions connected to each other by universal joints.

27. A method for filling recesses in a workpiece with a liquified substance, comprising the steps of:
placing the workpiece in a container having an open side and a closed side opposed thereto;
filling said container at least partially full with a liquified metal;
rotating said container about a rotation axis while simultaneously maintaining said container in a first orientation so that the distance between said open end of said container and said rotation axis is less than the distance between said closed end of said container and said rotation axis, whereby centripetal acceleration of said container and said liquified metal pressurizes the metal to thereby force the metal into the recesses in said workpiece;
pivoting said container to a second orientation so that the distance between said closed end of said container and said rotation axis is less than the distance between said open end of said container and said rotation axis;
revolving said container about said rotation axis upon completion of said step of pivoting, while simultaneously maintaining said container in said second orientation; and
holding said workpiece in said container at least during said steps of pivoting and revolving so that said workpiece remains in said container while free liquified metal is discharged therefrom.

28. The method defined in claim 27, further comprising the step of creating a vacuum in said container prior to said step of filling.

29. The method defined in claim 28, further comprising the step of exerting a retaining force on said workpiece to hold same within the liquified metal in said container during said step of rotating.

30. The method defined in claim 29, wherein said workpiece is held proximately to said closed end of said container during said step of rotating.

31. The method defined in claim 29, wherein said step of placing comprises the steps of inserting the workpiece into a workpiece holder and subsequently inserting said holder into said container.

32. The method defined in claim 31 wherein said holder is provided with retaining means for performing said step of exerting a retaining force on said workpiece.

33. The method defined in claim 32 wherein said retaining means includes a screen.

34. The method defined in claim 31 wherein said holder is provided with retaining means for performing said step of holding.

35. The method defined in claim 34 wherein said retaining means includes a screen.

36. The method defined in claim 29, further comprising the step of supplying heat energy to the liquified metal in said container during said step of swinging.

37. The method defined in claim 36 wherein said container has a portion consisting of a thermally conductive material in contact with the liquified metal during said step of swinging, the step of supplying heat energy to the liquified metal in said container being accomplished by means of said thermally conductive material.

38. The method defined in claim 36 wherein said step of filling comprises the steps of (a) rotating said container about said rotation axis while simultaneously maintaining said container in said first orientation and (b) conducting the liquified metal to the open end of said container from a reservoir located at a distance from said rotation axis smaller than the distance between said container and said rotation axis.

39. The method defined in claim 38, further comprising the step of transferring heat energy to the liquified metal in said reservoir.

40. The method defined in claim 39, further comprising the steps of putting solid particles of the metal in said reservoir and heating said particles to liquify said metal, said steps of putting and heating being executed prior to said step of filling.

41. The method defined in claim 38 wherein said reservoir is located within a boom rotatable about said axis of rotation and said container is pivotably mounted to said boom at a free end thereof spaced from said rotation axis, said reservoir having an outlet juxtaposed to said open end of said container in said first orientation.

42. The method defined in claim 38 wherein said step of pivoting is performed during said step of rotating and wherein said container is continuously swung about said rotation axis during said steps of rotating, pivoting and revolving.

43. The method defined in claim 42 wherein said step of pivoting comprises the step of applying a braking force to a gear rotatively coupled to a rotary transmission train extending to said container.

44. The method defined in claim 43 wherein said rotary transmission train includes an additional gear rigid with said container and a shaft extending from said rotation axis to said additional gear, said shaft having a worm thread engageable wlth teeth of said additional gear.

45. The method defined in claim 43 wherein said container is attached to a free end of a boom rotatable about said rotation axis, said container being pivotably mounted to said boom for at least partial rotation about a pivot axis, said container having a center of gravity located on a side of said pivot axis opposite said open side of said container, whereby swinging said container about said rotation axis maintains said container in said first orientation.

46. The method defined in claim 45 wherein said open side of said container is between said rotation axis and said closed side of said container in said first orientation.

47. The method defined in claim 46 wherein said container has an elongate shape.

48. The method defined in claim 43 further comprising the step of depositing a charge of powdered talc in said container prior to said step of filling.

49. The method defined in claim 48 wherein said workpiece is a tiny ceramic body and said recesses are plate-shaped, said workpiece being placed into said container with a multiplicity of ceramic bodies substantially identical in structure to said workpiece.

50. In a method for producing a multilayer capacitor comprising the steps of placing a multiplicity of workpieces in a container, depressurizing said container to form at least a partial vacuum therein, and filling said container with liquid metal, said workpieces each having a plurality of their plate-shaped recesses, the improvement comprising the step of placing powdered talc in said container prior to said step of filling, and further comprising the steps of (a) rotating said container about a rotation axis to pressurize the liquid metal in said container and (b) pivoting said container while rotating same about said rotation axis to discharge free liquid metal from said container upon injection of a portion of the liquid metal into the recessed in said workpieces.

51. An apparatus for filling minute recesses in a workpiece with a metallic substance, said apparatus comprising:
a frame;
container means having a receptacle for receiving the workpiece;
rotary support means for supporting said container, said rotary support means including a support arm mounted to said frame for rotation about a rotation axis;
drive means operatively linked to said rotary support means for rotating said support arm and said container means about said rotation axis;
retaining means disposed in said receptacle for retaining said workpiece therein;
feed means mounted to said frame for filling said receptacle at least partially full with a liquified material;
heating means in said container means for supplying thermal energy to liquified metal in said receptacle to maintain the metal in a liquified form during a metal injection phase of an operating cycle; and
actuator means mounted to said frame for ejecting free liquified metal from said receptacle during a discharge phase of an operating cycle upon an injection of a portion of the liquified metal in said receptacle into the recesses in said workpiece.

52. The apparatus defined in claim 51 wherein said feed means is provided on said support arm.

53. The apparatus defined in claim 51 wherein at least a portion of said actuator means is provided on said support arm.

54. The apparatus defined in claim 51 wherein said receptacle has an open end and a closed end opposite thereto and wherein said container means is pivotably connected to said support arm for rotation about a pivot axis, said actuator means including turning means operatively linked to said container means for rotating same about said pivot axis so that during said discharge phase said closed end of said receptacle is located at a distance from said rotation axis which is smaller than the distance between said open end of said receptacle and said rotation axis.

55. The apparatus defined in claim 54 wherein said open end is disposed between said rotation axis and said closed end during said injection phase and wherein said closed end is disposed between said rotation axis and said open end during said discharge phase.

56. The apparatus defined in claim 55 wherein said container means has a center of gravity disposed on a side of said pivot axis opposite said open end, whereby rotation of said support arm and said container means about said rotation axis at a high angular velocity causes said receptacle to assume an orientation in which said open end and said closed end are aligned along a direction perpendicular to said rotation axis and with said open end being disposed between said rotation axis and said closed end.

57. The apparatus defined in claim 58 wherein said actuator means includes a gear floatingly mounted to one of said drive means and said rotary support means, said actuator means further including a rotary power transmission train operatively coupled at one end to said gear and at an opposite end to said container means, said actuator means including braking means for slowing the rate of rotation of said gear.

58. The apparatus defined in claim 57 further comprising a housing mounted to said frame, said support arm and said container being disposed within said housing.

59. The apparatus defined in claim 58 wherein said braking means includes a braking shaft fixed at a first end to the floatingly mounted gear, said braking shaft traversing an opening in said housing so that a second end of said braking shaft opposite said first end is disposed outside of said housing, said braking means further including means engageable with said braking second end of said shaft for slowing the rotation speed thereof.

60. The apparatus defined in claim 59, further comprising air pumping means connectable to said housing for forming a vacuum therein, said braking shaft being journaled in a vacuum bearing in said opening.

61. The apparatus defined in claim 59 wherein said drive means includes a drive shaft, further comprising shiftable support means for mounting said support arm and said drive shaft to said frame and compensation means connected to said support means for restoring said drive shaft to a central position upon a shifting of the drive shaft therefrom in response to a load imbalance.

62. The apparatus defined in claim 61 wherein said braking shaft includes three shaft portions connected to each other by universal joints.

63. The apparatus defined in claim 57 wherein said transmission train includes an additional gear rigid with said container means and a shaft extending parallel to said support arm, said shaft being rotatably mounted to said support arm and having a worm thread engageable with teeth of said additional gear.

64. The apparatus defined in claim 63 wherein said actuator means includes limiting means for providing a limited range of angles through which said additional gear can rotate.

65. The apparatus defined in claim 64 wherein said limiting means includes an indent on an edge of said additional gear for preventing engagement of said additional gear with said worm thread.

66. The apparatus defined in claim 63 wherein said shaft is provided at opposite ends with worm threads engageable with respective gears.

* * * * *

UNITED STATES PATENT AND TRADEMARK OFFICE
CERTIFICATE OF CORRECTION

PATENT NO. : 4,687,044
DATED : August 18, 1987
INVENTOR(S) : Clarence L. Wallace It is certified that error appears in the above-identified patent and that said Letters Patent is hereby corrected as shown below:

Column 4, line 22, change "accomodate" to --accommodate--.

Column 4, line 44, change "substances" to --substance--.

Column 5, line 13, change "workpiece. The" to --workpiece, the--.

Column 5, line 33, change "tramission" to --transmission--.

Column 7, line 35, change "49, 51, 51" to --49, 51, 53--.

Column 7, line 47, change "end universal" to --end. Universal--.

Column 7, line 52, change "end" to --ends--.

Column 8, line 26, change "be 13 noted" to --be noted--.

Column 9, line 48, change "pair" to --pairs--.

Column 10, line 67, change "predeterined" to --predetermined--.

UNITED STATES PATENT AND TRADEMARK OFFICE
CERTIFICATE OF CORRECTION

PATENT NO. : 4,687,044
DATED : August 18, 1987
INVENTOR(S) : Clarence L. Wallace It is certified that error appears in the above-identified patent and that said Letters Patent is hereby corrected as shown below:

Column 12, line 4, "resevoir" to --reservoir--.

Column 12, line 50, change "holder 15" to --holders 115--.

Column 13, line 13, change "o" to --or--.

Column 13, line 29, change "breaking" to --braking--.

Column 13, line 30, change "electromagctically" to --electromagnetically--.

Column 14, line 17, change "advanageously" to --advantageously--.

Column 19, line 28, change "recessed" to --recesses--.

Column 20, line 17, change "58" to --56--.

Signed and Sealed this

Sixteenth Day of August, 1988

Attest:

DONALD J. QUIGG

Attesting Officer

Commissioner of Patents and Trademarks